Jan. 3, 1950  B. E. BRAUCHT  2,493,222
WARMING RACK
Filed Jan. 24, 1949
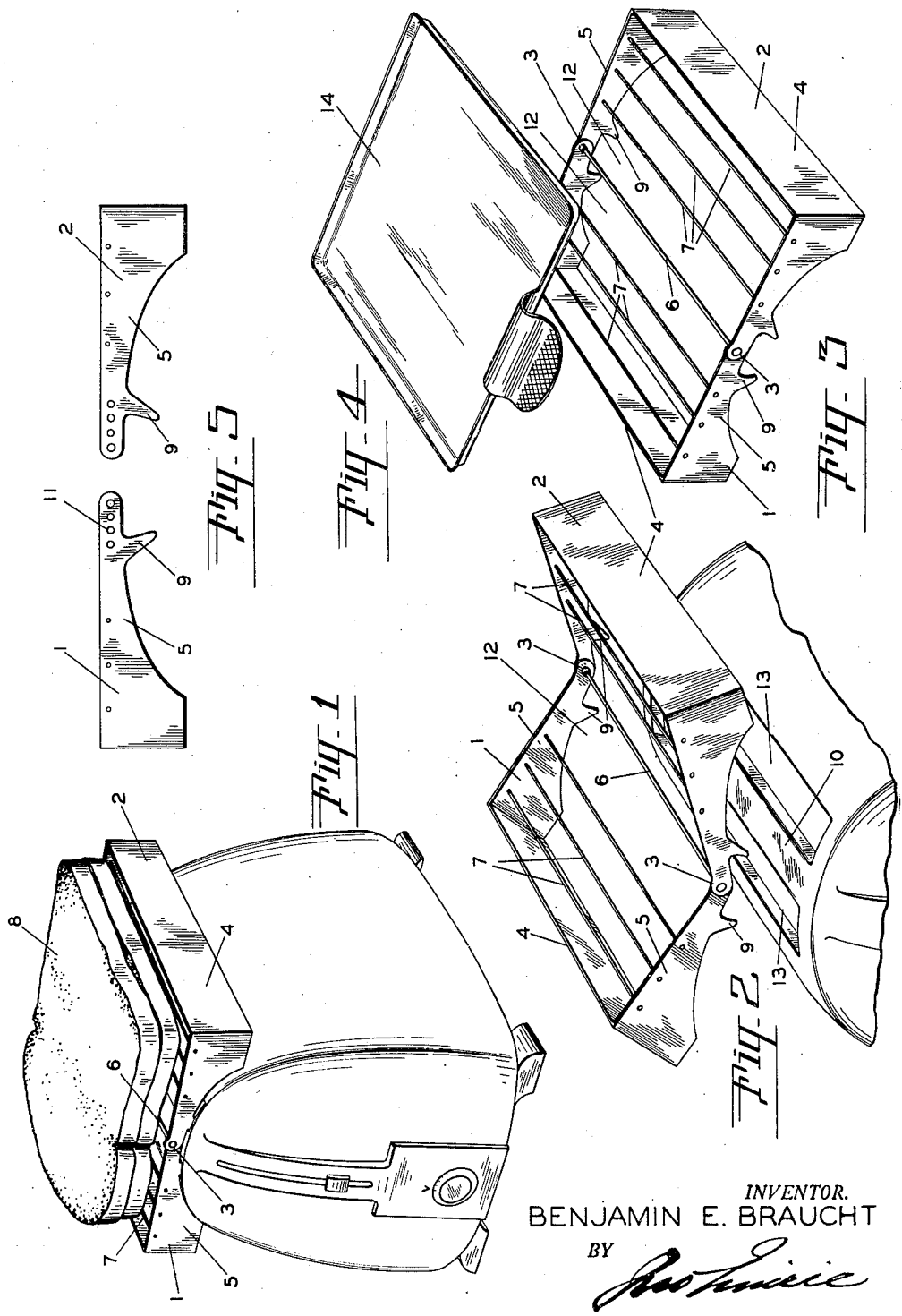
INVENTOR.
BENJAMIN E. BRAUCHT
BY
ATTORNEY Patented Jan. 3, 1950

2,493,222

UNITED STATES PATENT OFFICE 2,493,222

WARMING RACK

Benjamin E. Braucht, Salem, Oreg.

Application January 24, 1949, Serial No. 72,319

5 Claims. (Cl. 99—339)

This invention relates to warming racks for toasters and is particularly adapted to automatic toasters.

The primary object of the invention is to mount a warming rack on the top of the toaster adapted to support the toast that has already been toasted, maintaining the said toast in a warmed condition.

A further object of the invention is to provide a rack that will support a tray for maintaining other articles of food in a warmed condition by use of the heat radiated from the toaster.

Another object of my invention is to provide a warming rack for toasters in the form of an accessory readily adapted to fit various designs of toasters.

These and other incidental objects will be apparent in the drawings, specifications and claims.

Referring to the drawings:

Figure 1 is a perspective view of an automatic toaster having my new and improved warming rack mounted thereupon.

Figure 2 illustrates how the rack is mounted to the toaster.

Figure 3 illustrates a perspective view of the rack.

Figure 4 is a perspective view of a warming tray adapted to nest in the rack for maintaining other foods in a warmed condition while the toast is being made.

Figure 5 is an end view of a modified form of rack illustrating how the same may be adjusted to adapt the same to various types of toasters.

Referring more specifically to the drawings:

My new and improved warming rack consists of two frame sections 1 and 2 hingedly secured together at 3. These sections consist of side members 4 and end members 5. As stated above the end members are hingedly secured together at 3 and spaced apart by the rod 6 in order to maintain the shape of the rack.

Supporting wires or rods 7 are fixedly mounted between the end frames 5 and are adapted to support the toast 8 thereon. Fingers or jaws 9 extend downwardly from the end members and are adapted to grip the center portion 10 of the toaster, as best illustrated in Figures 1 and 2.

When the rack is not in use the sections 1 and 2 are folded together requiring a minimum of space for storage. When the rack is mounted to the toaster the sections are unfolded as illustrated in Figure 2 and the fingers or jaws 9 are brought down on either side of the metal portion 10. When the rack is straightened out as illustrated in Figures 1 and 3 these jaws grip the middle section 10 of the toaster maintaining the rack thereon.

Referring to Figure 5 I have illustrated how the space between the jaws 9 can be adjusted by providing a number of pivot holes 11 in the end portions 5, thereby providing an adjustment for adapting the rack to various toasters. Automatic toasters have the center portion 10 of various widths requiring this adjustment.

The spaces 12 between the rod 7 adjacent the rod 6 are directly above the openings 13 of the toaster and are of sufficient width to permit the toast to pop up between these spaces. This slightly raises the toast 8 indicating to the attendant that the toast within the toaster has been completed and ready to be removed and stacked upon the rack, the toast 8 being temporarily removed from the rack permitting the removal of said toast and the placing of bread to be toasted.

I have provided a tray 14 that can be placed over the rods 7 for maintaining other articles of food in a warmed condition that is not adapted to rest on the rods.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. A grill for use with a toaster of the type having in its top two spaced slots and a space therebetween for receiving bread slices, said grill comprising a frame for overlying said toaster and having at opposite ends two relatively pivotal fingers for insertion in the toaster slots and which incline toward each other in operative position to underlie the space between the slots and anchor the frame to the toaster in a position above the toaster slots to receive heat therefrom.

2. A grill as defined in claim 1 wherein a plurality of spaced rods are supported longitudinally in said frame to form the grill, said rods being spaced to free the area above the toaster slots for access through said grill to said slots.

3. A grill as defined in claim 2 wherein the frame comprises two portions pivotally connected by the center of said rods, said fingers being formed rigidly with said portions.

4. A grill as defined in claim 3 wherein said frame portions are provided with a plurality of spaced apertures for selectively receiving said center rod for varying the size of said grill.

5. A grill as defined in claim 1 wherein a tray removably seats on said grill.

BENJAMIN E. BRAUCHT.

REFERENCES CITED

The following references are of record in the file of this patent:

UNITED STATES PATENTS

| Number | Name | Date |
|---|---|---|
| D. 121,598 | Post | July 23, 1940 |
| 1,194,663 | Reinking | Aug. 15, 1916 |
| 1,587,023 | Mottlau | June 1, 1926 |
| 2,030,047 | Bonzagni et al. | Feb. 11, 1936 |
| 2,360,026 | Wall | Oct. 10, 1944 |

FOREIGN PATENTS

| Number | Country | Date |
|---|---|---|
| 224,904 | Great Britain | June 11, 1925 |